United States Patent [19]

Beverley et al.

[11] 3,997,824
[45] Dec. 14, 1976

[54] ELECTRICAL PROPULSION SYSTEM AND CONTROL ARRANGEMENTS THEREFOR

[75] Inventors: John A. Beverley, Schenectady; Richard L. Koch, Scotia, both of N.Y.

[73] Assignee: General Electric Company, Schenectady, N.Y.

[22] Filed: Apr. 20, 1973

[21] Appl. No.: 353,154

[52] U.S. Cl. .............................. 318/144; 318/148
[51] Int. Cl.² ........................................ H02P 5/22
[58] Field of Search ........................... 318/144, 148

[56] References Cited
UNITED STATES PATENTS

| | | | |
|---|---|---|---|
| 3,321,684 | 5/1967 | Stamm | 318/144 X |
| 3,340,413 | 9/1967 | Drabik | 318/148 X |

*Primary Examiner*—B. Dobeck
*Attorney, Agent, or Firm*—Vale P. Myles

[57] ABSTRACT

An electrical propulsion system and control arrangements therefor, particularly advantageous for ship use, are disclosed. Power is supplied by an alternating current generator through rectifiers to two direct current motors each of which drives a propeller. The armatures of the motors and the rectifiers are connected in a series loop. The speed and direction of rotation of the motors are controlled by varying the motor fields. When the fields of the motors are reversed, for example for deceleration, regenerative energy fed through the propellers could cause excessive current to flow in the closed loop with resultant damage to the electrical apparatus. To prevent current above a predetermined maximum in this loop, a sensor responsive to current in the loop is provided and a signal from the sensor automatically controls the field of at least one of the motors to cause that motor to develop a back EMF preventing excessive flow of current in the loop. Regenerative energy fed into the system is dissipated to the water through this motor and the propeller driven thereby. The sensor also modifies the field of the generator to reduce its output when excessive current in the loop is detected.

8 Claims, 2 Drawing Figures

ELECTRICAL PROPULSION SYSTEM AND CONTROL ARRANGEMENTS THEREFOR

BACKGROUND OF THE INVENTION

This invention relates to electrical propulsion systems and more particularly to control arrangements for such systems.

In electrical propulsion systems for relatively large transport means, such as ships, effective arrangements must be provided for dissipation of regenerative energy developed in such systems, particularly during rapid deceleration of such transport means. For example, in connection with ships such as ferries, it is necessary to effect deceleration of an object having relatively high inertia as the ferry approaches its slip for docking. Usually, in connection with ship propulsion this deceleration is accomplished by reversing the propellers so as to slow the forward motion of the ship.

If the propellers are driven by electric motors the continuing motion of the ship thru the water as a result of this inertia tends to cause regenerative energy to be developed in the system as a result of the effect of the surrounding water on the propellers as the ship continues to move thru the water.

In some prior art propulsion systems, which have employed direct current generators as a source of power, it has been possible to dissipate this regenerative energy by causing the generator to motor the prime mover and thereby dissipate the energy as losses in the prime mover. In systems which employ an alternating current generator for driving direct current propulsion motors through an intervening rectifying means it is not possible to dissipate regenerative energy in the above manner, since the rectifying means blocks the transmission of such regenerative energy back to the generator and thence to the prime mover.

Another prior art arrangement for dissipating regenerative energy in connection with motor reversal in both marine and industrial applications is the use of resistors. The function of such resistors is to absorb and dissipate the regenerative energy as heat. In the case of large apparatus the size and cooling requirements of such resistors become a serious problem, particularly in shipboard installations where space may be limited.

In accordance with the present invention, an arrangement is provided which dissipates such regenerative energy in a system including an alternating current generator and rectifying means without requiring large banks of power resistors or other bulky heat dissipating apparatus. Moreover, particularly as applied to shipboard installations, the system of this invention provides rapid and smooth propeller reversal while limiting the current to a level below that which could damage the apparatus employed in the system.

It is an object of this invention to provide improved means for controlling the propulsion of a ship or other transport means having relatively high inertia.

It is another object of this invention to provide an improved electrical propulsion system which includes an improved arrangement for preventing overcurrent in the electrical propulsion system.

It is a further object of this invention to provide an improved means for effecting more rapid deceleration of the driven transport means.

It is still a further object of this invention to provide an improved electrical propulsion system including improved means for dissipating energy.

It is another object of this invention to provide, in a ship propulsion system, a more rapid and smoother propeller reversal while maintaining the current in the system below the level which could result in damage to the electrical apparatus employed.

In carrying out the objects of this invention, in one form thereof, an electrical propulsion system and control arrangements therefor are provided which include an alternating current generator which may be driven, for example, by a diesel engine. The output of the generator is connected to suitable rectifying means for converting the alternating current output to direct current. In the specific form of the invention disclosed two electrical motors are provided, each of which is connected to drive a propeller for moving the ship on which the equipment is mounted. The armatures of the motors are connected in series with the rectifying means in a closed loop. Each of the motors include a field whose polarity and magnitude are controlled for varying the speed and direction of rotation of the motor. Provision is also made for controlling the field of the generator to vary the output thereof.

When it is desired to reverse the direction of the motors, for example in effecting deceleration of the ship, the field of the motors are reversed. As a result of regenerative energy fed back into the system thru continued motion of the ship, the current in the aforementioned closed loop could reach an undesirably high value. The system includes a sensor for detecting when the current in the closed loop reaches a predetermined maximum value and for supplying a signal to regulating means for reducing power generated by the alternating current generator and for altering the polarity and magnitude of field current of one of the motors to maintain the current in the closed loop below the predetermined level. Energy fed back into the system as a result of the reversal of the field of one of the motors is dissipated into the water thru the propeller driven by the other motor. During any period of overcurrent in the closed loop, the field of this motor is automatically maintained at a polarity to drive that motor in its original direction, and the current therethrough is maintained at a magnitude sufficient to insure that the current in the closed loop does not exceed the predetermined maximum value.

DETAILED DESCRIPTION OF THE INVENTION

Figure 1:
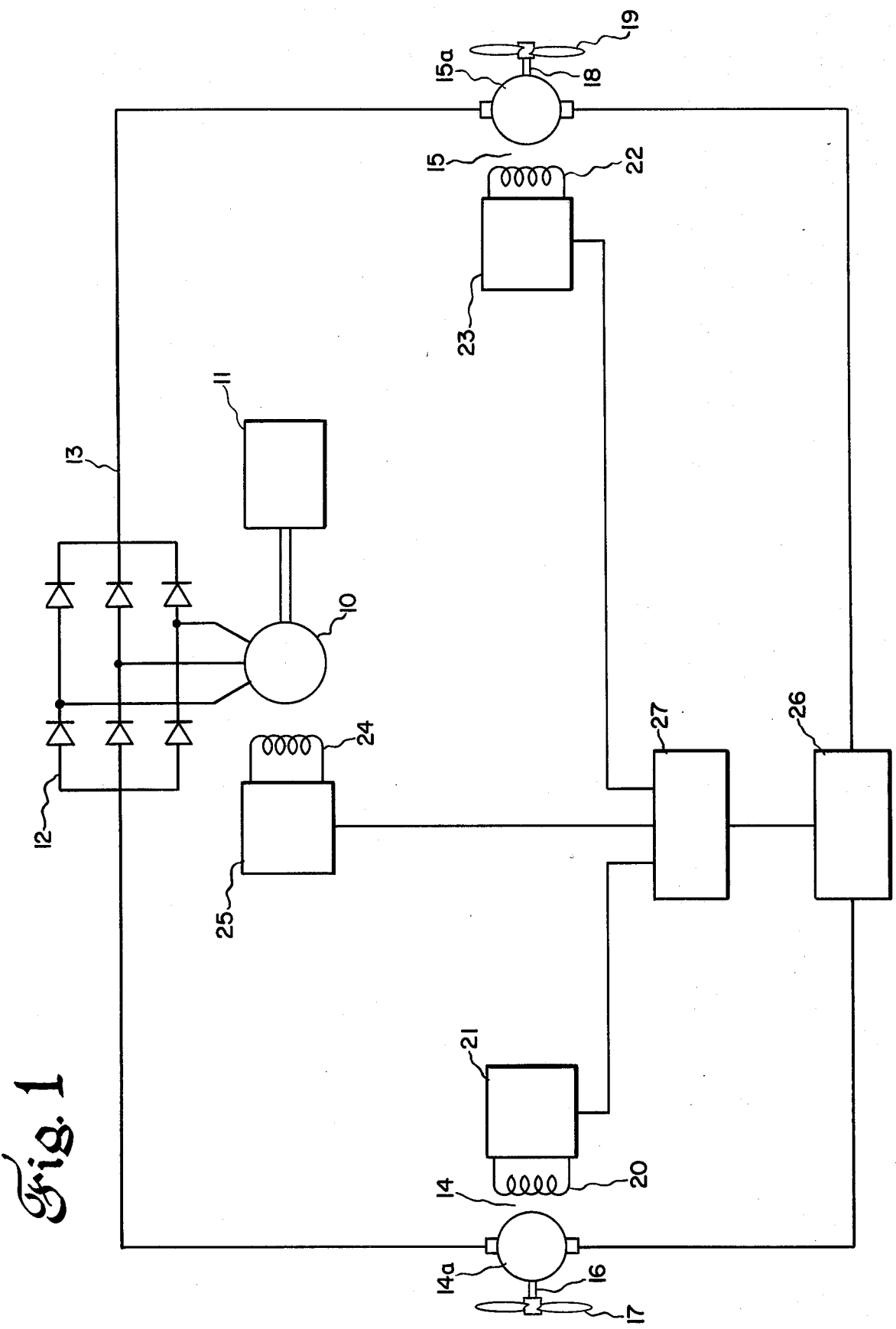
Figure 2:
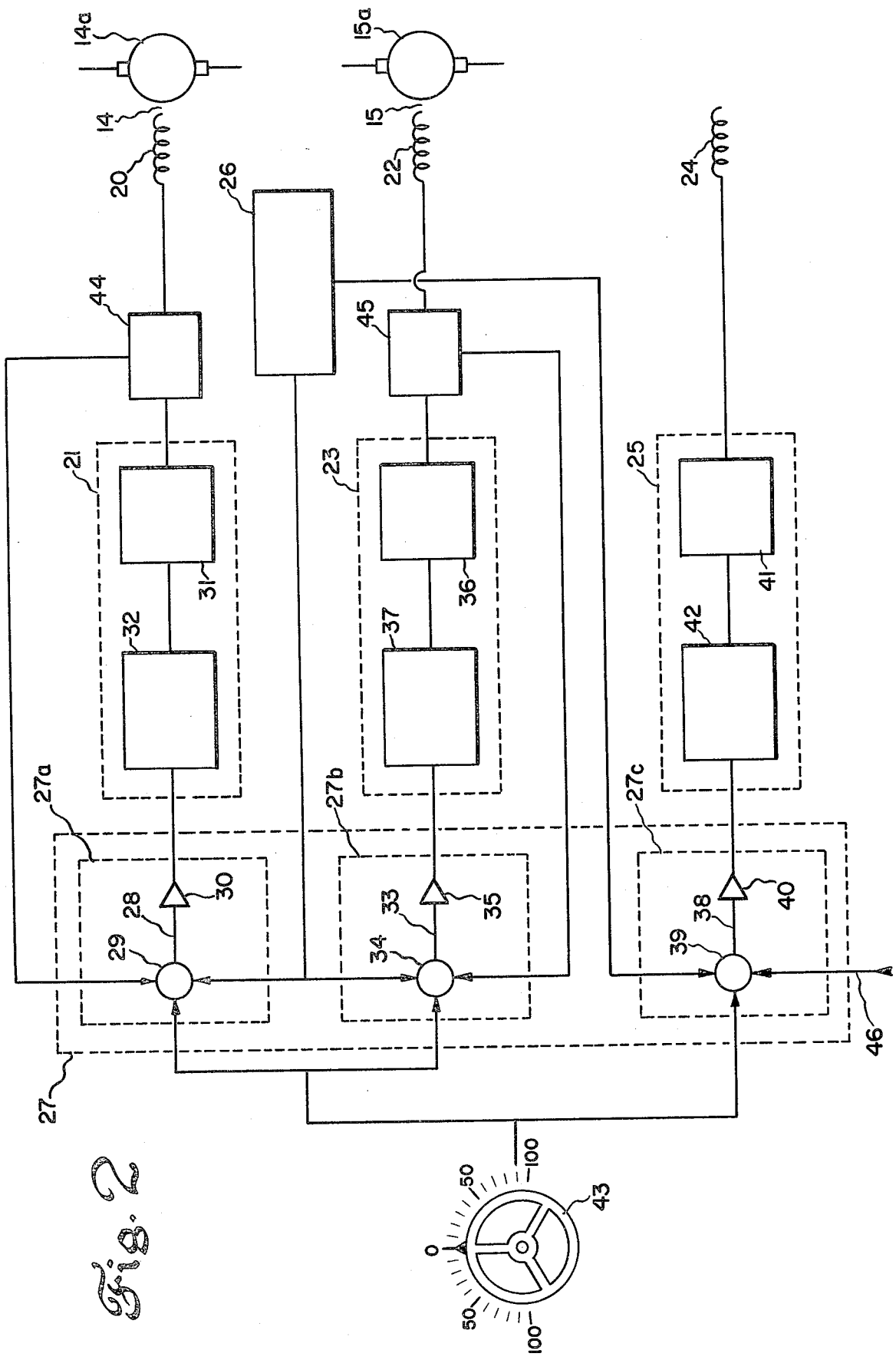

For a better understanding of the invention, reference may be had to the accompanying drawings in which:

FIG. 1 is a simplified schematic diagram of the electrical propulsion system and control arrangement of this invention, and FIG. 2 is a more detailed schematic representation of a portion of the control arrangement.

While it is contemplated that the propulsion system and control arrangement of this invention have other applications, it is particularly useful in connection with ship propulsion and is particularly described below in connection with such use. Moreover, it is described as employed in a double-ended ship, such as a ferry, having separately driven propellers at each end thereof.

Referring specifically to the embodiment of the invention shown in FIG. 1, the electrical propulsion system includes an alternating current generator 10 which may be driven by any suitable source of motor power, such for example, as a diesel engine 11. The three-phase output of the generator 10 is supplied to a rectifying means in the form of a bank of rectifiers 12 for converting the alternating current to direct current and supplying this direct current to a closed loop 13.

Propulsion for the ship is supplied by two direct current motors 14 and 15 which include armatures 14a and 15a respectively. The armatures 14a and 15a and the bank of rectifiers 12 are connected in series in the closed loop 13. Each armature is connected by a shaft to drive a propeller. For example, armature 14a of the motor 14 may be connected by a shaft 16 to a propeller 17 arranged at one end of the ship. Similarly, the armature 15a of the motor 15 may be connected by a shaft 18 to a propeller 19 disposed at the other end of the ship. Each of the motors includes a shunt field which may be altered in polarity and varied in magnitude to control the direction and speed of the motor. Thus motor 14 includes a shunt field 20, the supply of current to which is derived through a reversing exciter identified by the numeral 21. Similarly, the motor 15 includes a shunt field 22, the supply of current to which is derived thru a reversing exciter identified by the numeral 23.

The alternating current generator 10 also includes a controlled field 24, current to which is supplied through a variable current exciter identified by the numeral 25. In the case of the generator only the magnitude of the field is varied, the polarity remaining the same throughout its operation.

In the operation of ships, and particularly in the operation of ferries in connection with which this system is being more specifically described, it is necessary at times to reverse the motors and propellers to decelerate the ship. For example, as a ferry approaches its slip it is desirable to be able to reverse the motors and the propellers driven thereby in order to slow the movement of the ferry for docking. However, this reversing operation is accompanied by a supply of regenerative energy to the system. Thus, considering motor 14 and propeller 17 for example, should the field 20 be reversed in polarity in an attempt to reverse the direction of rotation of the motor and of the propeller 17 and thereby slow the forward motion of the ship, the inertia of the ship carrying it thru the water would cause "windmilling" of the propeller 17 and transfer of energy from the water to the propeller. This drives the motor 14 as a generator and, because of the reversal of the field 20, generates current flowing in the same direction in the closed loop 13 as that supplied by the generator 10 thru the bank of rectifiers 12.

This feedback of energy from the water to the propeller 17 and the motor 14, acting as a generator, can cause an excessive current to flow in the loop 13. Moreover, if the field of the motor 15 were similarly reversed, a similar flow of regenerative energy from the water thru windmilling propeller 19 would result. In order to limit the magnitude of the current flowing in the closed loop to the ratings of the apparatus employed, the control arrangement of this invention is incorporated in the electrical propulsion system. More specifically, a sensing means or current sensor 26, which may be any suitable standard direct current current transformer, is incorporated to sense the magnitude of the current thru the closed loop 13. The sensor 26 is connected to a regulating means 27 which includes components for controlling the exciters 21, 23, and 25 and the associated fields 20, 22, and 24 respectively.

The regulating means 27 includes components for controlling the magnitude and polarity of the current supplied to the shunt field 20 of the motor 14, components for controlling the magnitude and polarity of the current supplied to the shunt field 22 of the motor 15, and components for controlling the magnitude of the current supplied to the shunt field 24 of the AC generator 10. Actually, as will be explained later in the specification, the regulating means 27 comprises three separate substantially identical regulators for controlling the respective shunt fields of the two motors and the generator, but for convenience and simplicity it will be discussed as a single, consolidated regulating means in the description of FIG. 1. The regulating means is programmed to affect the shunt field of one of the motors and of the generator when the sensor 26 indicates that a predetermined maximum level of current in the closed loop 13 has occurred. Thus, for example, if the operator of the ship, in attempting to decelerate forward motion, manually effects reversal of the shunt fields of the motors 14 and 15 and the regenerative energy fed thru the propellers causes the current in the closed loop 13 to reach the predetermined maximum level, the regulating means 27 effects a reduction in the current thru the field 24 to reduce the output of the alternating current generator. It also causes the polarity of the shunt field of one of the motors, for example motor 15, to revert to that employed for forward motion of the ship thereby overriding the manual command of the ship operator to reverse the polarity of this shunt field. This causes the motor 15 to continue to operate as a motor, developing a back EMF which opposes the voltage being developed by motor 14, now acting as a generator. This, coupled with the reduction in power output of the AC generator previously mentioned, causes the current in the closed loop 13 to be brought down below the predetermined maximum level. During this time the regenerative energy fed into the system thru the windmilling propeller 17 and the motor 14 is dissipated thru the motor 15 and propeller 19 into the water. This overcomes the disadvantage of being unable to feed regenerative energy into the alternating current generator and the prime mover driving that generator and also eliminates the need for banks of power resistors as an alternative means for dissipating such regenerative energy.

The control arrangement for the electrical propulsion system of this invention is shown in more detail in FIG. 2. As there illustrated, the regulating means 27 comprises three substantially identical components 27a, 27b, and 27c. Referring to component 27a, this comprises a summing amplifier 28 which includes a summing junction 29 and an operational amplifier 30 to which the output of the summing junction is supplied. The output of the summing amplifier 28 is supplied to the reversing exciter 21 which comprises, as indicated schematically in FIG. 2, an SCR network 31 and a gate firing circuit 32 which gates the SCR network to supply current of the proper polarity and magnitude to the field 20 of the motor 14. Component 27b includes identical elements for controlling the current in the field 22 of the motor 15. Thus component 27b comprises a summing amplifier 33 which includes a summing junction 34 and an operational amplifier 35. The output of summing amplifier 33 is similarly supplied to the reversing exciter 23, which comprises an SCR network 36 and a gate firing circuit 37, for supplying current of proper polarity and magnitude to the field 22 of motor 15.

Component 27c comprises a summing amplifier 38 which includes a summing junction 39 and an operational amplifier 40. The output of the summing amplifier 38 is connected through exciter 25 to the field 24 of the generator 10. The circuit of exciter 25 is similar to that illustrated for reversing exciters 21 and 23, except that the SCR network 41, controlled by a gate firing circuit 42, is somewhat simplified because current supplied to the generator field is always of one polarity and it is not necessary to provide circuitry for permitting reversal of polarity as in the case of the fields of the motors 14 and 15.

Each of the summing junctions shown in components 27a, 27b, and 27c, respectively, is provided with three inputs. One input is provided by a manual control, such as a handwheel 43. The handwheel 43 may be turned in one direction to provide a signal indicating a desire for current through the motor fields in a direction to provide one direction of rotation of the motors, and may be turned in the opposite direction to provide the opposite direction of rotation of the motors. The handwheel may be manually turned by a varying amount to provide the desired voltage reference signal to the summing junction 39 to supply one input for controlling the generator field 24.

A second input to the summing junctions is provided from the current sensor 26 which introduces a component indicative of the current in the closed loop 13.

A third input to the summing junctions 29 and 34 is provided by sensing means 44 and 45, respectively, which are arranged to sense the current in motor fields 20 and 22, respectively. The sensing means 44 and 45 may be any suitable type of current sensing device, for example they may be similar to the direct current current transformer employed for the sensor 26. The third input 46 to the summing junction 39 of component 27c differs from that of components 27a and 27b and is specifically a signal derived from the voltage of the bank of rectifiers 12 and is indicative of that voltage.

The operation of the electrical propulsion system and control arrangements therefor, as contemplated by this invention, is as follows. Assume that the ship is proceeding forwardly, with the propeller 17 being at the forward end of the ship and the propeller 19 at the rearward end. Assume that both motors 14 and 15 are being driven as motors with power supplied from the generator 10 through the bank of rectifiers 12 by means of the closed loop 13. Assume that the ship, for example a ferry, is approaching its slip and the operator desires to slow its speed preparatory to docking. He operates the manual control or handwheel 43, moving it to the right or left to reverse the then existing polarity of the shunt fields 20 and 22. This supplies an appropriate reference signal to the summing amplifiers 28 and 33 in the components 27a and 27b, respectively. The amount of movement of the handwheel determines the magnitude of the voltage reference signal transmitted to the summing amplifier 38 of component 27c.

Under these circumstances, as the inertia of the ship continues to carry it through the water, the effect of the water causes the propellers to continue to turn in the same direction. This applies energy from the water through the propellers, driving the motors as generators. Since the fields of the motors have been reversed, this generates a current flowing in the same direction through the closed loop 13 as the current from the bank of rectifiers 12. Moreover, the back EMF existing when the motors were acting as motors decreases, allowing more current to be drawn from the generator 10 through the bank of rectifiers 12. If allowed to continue, this could result in substantial overcurrent through the closed loop 13 and resultant damage to the electrical apparatus in the system. Moreover, this could actually delay the effective slowing down of the ship.

In the operation of the system of this invention, however, this condition is immediately sensed by the sensor 26. In the system as it functions, the polarity of the shunt field 20 of the motor 14, under the assumed conditions set forth above, is allowed to remain reversed, as dictated by the operator's manual control, but the signal from the sensor 26 affects the operation of the component 27b of the regulating means 27. Specifically, this signal is fed into the summing junction 34 of the summing amplifier 33 to cause appropriate change in shunt field 22 of the motor 15. This signal from the sensor 26 overrides, under these conditions, that from the manual control 43 and causes the summing amplifier 33 to supply an appropriate input signal to the reversing exciter 23. This signal is supplied to the gate firing circuit 37 to gate the SCR network 36 and cause the appropriate current to flow in the proper direction through the shunt field 22. More specifically, under this condition, the polarity of the field 22 is caused to return to that required to drive the motor in a direction to provide continued forward motion of the ship, thereby effectively overriding the manual control 43 insofar as the motor 15 is concerned. The back EMF generated by the motor 15 under these conditions opposes the voltage developed by the motor 14, now acting as a generator, and causes the current flowing in the closed loop 13 to be limited to the predetermined maximum value. As the current in the closed loop 13 is reduced, the current in the field 22 of the motor 15 is reduced. Ultimately a condition is reached where the polarity of the field 22 of the motor 15 is reversed to the condition commanded by the manual control 43, thereby driving the motor 15 and propeller 19 in a direction to assist the motor 14 and propeller 17 in decelerating the ship.

At the same time that the signal from sensor 26 is being applied to motor 15, the signal from the sensor 26 is also being supplied to the summing junction 39 of the summing amplifier 38. This results in a signal being transmitted from the operational amplifier 40 to the exciter 25 to reduce the magnitude of the current through the field 24 of the alternating current generator 10 and thereby to reduce the output of the alternating current generator. This further assists in limiting the current in the closed loop to the predetermined maximum value.

The electrical propulsion system and control arrangement of this invention are particularly useful in connection with ships such as ferries which operate equally well in both directions and do not have to turn around in shuttling back and forth between slips on opposite sides of the body of water being traversed. When the ferry is operating in the opposite direction from that just described and deceleration is desired, the field 22 of the motor 15 will be reversed manually and remain reversed and the field 20 of the motor 14 will then be automatically regulated in exactly the same manner as that described in detail above in connection with the field 22 of motor 14. Should the electrical propulsion system be applied to a ship designed to operate in only one direction the regulating means need be applied to only one of the motors, for example that driving the rear propeller; the other motor could be entirely under manual control. Automatic limitation of the current through the closed loop 13 would then be accomplished by automatic control of the field of the rear motor and of the field of the generator as a result of signals provided by the sensor 26.

This invention has been described in connection with ship propulsion where it has particular applicability and its operation has been set forth with relation to use in ferries where it has even more particular usefulness. It will be understood, however, that the propulsion system and control arrangements may be used in other environments where high inertia of the transport means may cause substantial regenerative energy to be supplied to the system and it is necessary to dissipate the energy without exceeding the rating of any components of the apparatus and causing damage thereto. Moreover, other modifications may be made. For example, while the exciters for the shunt field have been indicated as comprising solid state circuits, it will be understood that other equipment, for example rotating dynamoelectric machines could be used as exciters if desired.

Thus, while a specific embodiment of this invention has been illustrated and described, modifications will occur to those skilled in the art and it is intended by the appended claims to cover such modifications as come within the spirit and scope of this invention.

What is claimed as new and desired to be secured by Letters Patent of the United States is:

1. An electrical propulsion system mounted aboard a ship for providing propelling and braking forces to water-engaging propulsion means of the ship comprising:
   an alternating current generator,
   rectifying means connected to said generator for providing a direct current output,
   a first direct current motor, said first motor including a first armature and a first field,
   a second direct current motor, said second motor including a second armature and a second field,
   said rectifying means and said first and second armature being connected in series in a closed loop,
   manually operated means for controlling the polarity of the current applied to said first and second fields,
   means for sensing the current in said closed loop when the polarity of current supplied to the field of one of the motors is reversed to cause it to operate as a generator during a dynamic braking operation, and
   regulating means connected to said sensing means for receiving a signal from said sensing means and in response to said signal supplying a control signal to the field of at least one of said motors, said regulating means controlling the polarity and magnitude of the current supplied to said field for limiting the current in said closed loop to a predetermined maximum level by causing the voltage developed in the loop by the armature of said one motor to vary relative to the voltage developed by the other motor.

2. The electrical propulsion system of claim 1 wherein said alternating current generator includes a field, and wherein said regulating means further controls the magnitude of the current supplied to said generator field for controlling the output of said generator to limit the current in said closed loop.

3. The electrical propulsion system of claim 2 wherein said regulating means includes a first component for controlling the polarity and magnitude of the field of said first motor and a substantially identical second component for controlling the polarity and magnitude of the field of said second motor, and wherein said regulating means includes a third component for controlling the magnitude of the field of said generator.

4. The electrical propulsion system of claim 1 wherein said regulating means includes a summing amplifier having a first input for receiving a control signal from said manually operated means and a second input for receiving a control signal from said sensing means, and further includes an operational amplifier connected to receive the output of said summing amplifier.

5. The electrical propulsion system of claim 4, and further including an SCR network connected to the field of one of said motors, and wherein the output of said operational amplifier is supplied to said SCR network for effecting control of the polarity and magnitude of the current to said field.

6. The electrical propulsion means of claim 5 and further including a second sensing means for sensing the current in the field of said one of said motors and means connecting said second sensing means to a third input of said summing amplifier for controlling the current in said field of said one of said motors.

7. An electrical propulsion system for shipboard use comprising:
   an alternating current generator,
   rectifying means connected to said generator for providing a direct current output,
   a first direct current motor, including a first armature and a first field, for driving a first propeller,
   a second direct current motor, including a second armature and a second field, for driving a second propeller,
   said first and second armatures and said rectifying means being connected in series in a closed loop,
   manually operated means for controlling the polarity of the current through said first and second fields,
   regenerative energy being fed into said system upon attempted reversal of said motors because of energy transferred from the water to said propellers during continued movement of the ship, thereby increasing the current in said loop,
   means for sensing the current in said loop, and
   regulating means connected to said sensing means for receiving a signal transmitted from said sensing means,
   said regulating means controlling the magnitude and polarity of the current supplied to at least one of said motors to cause said motor to supply a back EMF that opposes the voltage developed in said loop by the other motor, thereby limiting the current in said closed loop to a predetermined level, and
   said one of said motors further causing said regenerative energy to be dissipated to the water through the propeller driven by said one of said motors.

8. The electrical propulsion system of claim 7 wherein said alternating current generator includes a field and wherein said regulating means further controls the magnitude of the current supplied to said field for limiting the current in said closed loop to a predetermined maximum level.

* * * * *